US010558212B2

(12) United States Patent
Oppolzer et al.

(10) Patent No.: US 10,558,212 B2
(45) Date of Patent: Feb. 11, 2020

(54) METHOD OF OPERATING A VEHICLE AND A VEHICLE OPERATING SYSTEM (71) Applicant: Technological Resources Pty Ltd, Melbourne, VIC (AU)

(72) Inventors: Florian Oppolzer, Brisbane (AU); Justin Young, Burwood East (AU); Hume Saunders, Perth (AU); Brendan Betke, Thornbury (AU)

(73) Assignee: Technological Resources Pty Ltd, Melbourne (AU)

( * ) Notice: Subject to any disclaimer, the term of this patent is extended or adjusted under 35 U.S.C. 154(b) by 0 days.

(21) Appl. No.: 15/520,300

(22) PCT Filed: Oct. 29, 2014

(86) PCT No.: PCT/AU2014/050322
§ 371 (c)(1),
(2) Date: Apr. 19, 2017

(87) PCT Pub. No.: WO2016/065388
PCT Pub. Date: May 6, 2016

(65) Prior Publication Data
US 2017/0315549 A1 Nov. 2, 2017

(51) Int. Cl.
*G05D 1/00* (2006.01)
*B60W 30/095* (2012.01)
(Continued)

(52) U.S. Cl.
CPC ......... *G05D 1/0044* (2013.01); *B60W 30/095* (2013.01); *G01S 13/00* (2013.01);
(Continued)

(58) Field of Classification Search
CPC ............... G05D 1/0044; G05D 1/0274; G05D 2201/0202; B60W 30/095; G01S 13/00;
(Continued)

(56) References Cited

U.S. PATENT DOCUMENTS 6,055,042 A * 4/2000 Sarangapani ........... G01S 13/87
180/167
6,393,362 B1 * 5/2002 Burns .................. G05D 1/0278
340/940

(Continued)

OTHER PUBLICATIONS

Jan. 15, 2015—International Search Report and Written Opinion of PCT/AU2014/050322.

*Primary Examiner* — Courtney D Heinle
(74) *Attorney, Agent, or Firm* — Banner & Witcoff, Ltd.

(57) ABSTRACT

A vehicle operating system (10) for controlling operation of a vehicle (12) in an area (26) in which a safe working area (SWA) (30) is demarcated includes a periphery generator module (22) for generating a periphery of a zone of interest about the vehicle (12) and to output zone data. A scanning arrangement (36) is mountable to the vehicle (12) for scanning a region about the vehicle (12), including the zone of interest, for obstacles, the scanning arrangement (36) outputting obstacle data. A processing module (20) is responsive to the zone data, the obstacle data and SWA data relating to the SWA (30) to determine if a detected obstacle is within both the SWA (30) and the zone of interest. The processing module (20) causes action to be taken regarding further traversal of the area (26) by the vehicle (12) depending on whether or not both conditions are satisfied.

50 Claims, 8 Drawing Sheets (51) Int. Cl.
*G01S 13/00* (2006.01)
*G01S 17/02* (2006.01)
*G01S 17/42* (2006.01)
*G01S 17/89* (2006.01)
*G01S 17/93* (2006.01)
*G05D 1/02* (2006.01)

(52) U.S. Cl.
CPC ............ *G01S 17/026* (2013.01); *G01S 17/42* (2013.01); *G01S 17/89* (2013.01); *G01S 17/936* (2013.01); *G05D 1/0274* (2013.01); *G05D 2201/0202* (2013.01)

(58) Field of Classification Search
CPC ........ G01S 17/026; G01S 17/42; G01S 17/89; G01S 17/936
See application file for complete search history.

(56) References Cited

U.S. PATENT DOCUMENTS

| | | | | |
|---|---|---|---|---|
| 2005/0231341 | A1* | 10/2005 | Shimizu | B60Q 9/005 340/436 |
| 2006/0190124 | A1* | 8/2006 | Makela | G05D 1/028 700/213 |
| 2009/0259400 | A1* | 10/2009 | Coats | G01S 7/412 701/301 |

* cited by examiner

Fig. 17

METHOD OF OPERATING A VEHICLE AND A VEHICLE OPERATING SYSTEM

CROSS-REFERENCE TO RELATED APPLICATIONS

This application is a national phase application under 35 U.S.C. § 371 of International Application No. PCT/AU2014/050322, filed on Oct. 29, 2014, the disclosure of which is incorporated herein by reference in its entirety.

TECHNICAL FIELD

This disclosure relates, generally, to the operation of a vehicle. More particularly, this disclosure relates to a method of operating a vehicle, to a vehicle operating system and to a vehicle including the vehicle operating system.

The type of vehicle to be operated is any piece of mobile machinery but, in particular but not necessarily exclusively, mobile mining machinery.

BACKGROUND

The automation of vehicles is becoming increasingly prevalent for a number of reasons including greater efficiency and safety. There is thus a move to purpose-built vehicles that are optimised for autonomous or automated operation. One of the requirements for robust and safe automatic or fully autonomous operation is that the vehicle incorporate situational awareness capabilities and functionality.

This requires some means of detecting the boundaries of safe operation including potentially hazardous obstacles in the area in which the vehicle is operating. This is required so that the vehicle is not damaged, or causes damage to its surroundings, as it traverses the area or is controlled, whether autonomously or under remote control, to move to a location that could be dangerous or detrimental to operation of the vehicle or to its surroundings. However, it would be beneficial to maximise an operational envelope for the vehicle to give greater freedom to its autonomous capabilities.

While the use of cameras on vehicles provide some means of situational awareness of an operational zone about the vehicle, these cameras produce computationally complex output data. Such data require extensive bandwidth which adversely impacts communications between the vehicle and a remote location.

SUMMARY

In a first aspect, there is provided a method of operating a vehicle in an area in which a safe working area. (SWA) is demarcated, the method including generating a zone of interest about the vehicle;

scanning for obstacles relative to the zone of interest;

determining if a detected obstacle is within both the SWA and the zone of interest; and taking action regarding further traversal of the area by the vehicle depending on whether or not both preceding conditions are satisfied.

The method may include, if both of the preceding conditions are satisfied and if the obstacle is determined to have at least one characteristic that adversely affects continued traversal of the areas by the vehicle causing the vehicle to cease traversal of the area. Conversely, the method may include. if both of the preceding conditions are satisfied but a determination has been made that the determined characteristics of the obstacle permit traversal of the area by the vehicle relative to the obstacle, modifying the zone of interest to permit further traversal of the area by the vehicle relative to the obstacle. By "traversal of the area by the vehicle relative to the obstacle" does not necessarily mean that the vehicle drives over the obstacle but, rather, that the vehicle can be manoeuvred so that a part of the vehicle overhangs the obstacle. Further, the method may include modifying the zone of interest so that the obstacle falls outside or on the boundary of the zone of interest.

The method may include generating a plurality of concentrically arranged zones of interest and taking action depending on in which of the zones of interest the obstacle is detected. The method may include selecting a number of the concentrically arranged zones of interest and taking action dependent, on a number of criteria. The method may include selecting the number of zones of interest and their shape either from a library of preconfigured zones of interest or dynamically.

Thus, in an embodiment, the method may include generating a first, inner zone of interest about the vehicle and a second, outer zone of interest about the vehicle and taking action regarding further traversal by the vehicle depending on in which zone of interest the obstacle has been detected.

The method may include generating an alarm condition if the detected obstacle is in the outer zone of interest and disabling further traversal of the area by the vehicle if the obstacle is in the inner zone of interest, in both cases, the obstacle further being within or on a boundary of the SWA.

The method may include generating a bounding zone of interest to approximate a footprint of at least a predetermined part of the vehicle. The method may include altering a shape of the bounding zone of interest based on at least one of a characteristic of the obstacle detected and a change in a configuration of the vehicle. The method may include altering the shape of the bounding zone of interest either from a library of preconfigured zones of interest or dynamically.

The method may include implementing the SWA as an electronic representation of a boundary of the area and, in implementing the boundary, differentiating in the electronic representation of the boundary as to a type of obstacle defining the boundary. Examples of such obstacles include windrows and high walls on a mine bench and differentiating between the different types of obstacle may include differently colour-coding the relevant parts of the boundary dependent on the type of obstacle to be represented. Thus, in an embodiment, the method may include demarcating a windrow as a boundary portion of a first colour, for example, a red boundary and demarcating a high wall as a boundary portion with a different colour, for example, a blue boundary.

The method may include scanning a region about the vehicle to assess characteristics of the obstacle. The "characteristics" of an obstacle include the type of obstacle, the height of the obstacle, the gradient or slope of the obstacle, or the like. The scanner may also be implemented to detect characteristics of topography behind the obstacle such as declines, sharp drop-offs, or the like and these characteristics are to be understood as being included in the term "characteristics of the obstacle".

The method may include scanning a region about the vehicle in a vertical orientation to generate a vertical cross-sectional representation of the obstacle.

Further, the method may include implementing the scanned obstacle as at least one polygon representing the obstacle and its characteristics. The method may include assessing the scanned obstacle to determine whether or not the vehicle can safely traverse the obstacle.

The method may include generating a shape of the zone of interest to extend further from the vehicle in directions in which the vehicle traverses the area than in directions transverse to the directions of traversal of the vehicle. In other words, the zone of interest may extend further ahead of and behind the vehicle than to sides of the vehicle. Further, the zone of interest may extend further in the direction ahead of the vehicle than behind the vehicle. It will be appreciated that the zone of interest may be flexibly generated to change shape based on the traversal of the vehicle.

In a second aspect, there is provided a vehicle operating system for controlling operation of a vehicle in an area in which a safe working area (SWA) is demarcated, the system including a periphery generator module for generating a periphery of a zone of interest about the vehicle and to output zone data;

a scanning arrangement mountable to the vehicle for scanning a region about the vehicle, including the zone of interest, for obstacles and to output obstacle data; and a processing module responsive to the zone data, the obstacle data and SWA data relating to the SWA to determine if a detected obstacle is within both the SWA and the zone of interest, the processing module causing action to be taken regarding further traversal of the area by the vehicle depending on whether or not both conditions are satisfied.

If the obstacle is determined to have at least one characteristic that adversely affects continued traversal of the area by the vehicle and both of the preceding conditions are satisfied, the processing module may be configured to cause the vehicle to cease traversal of the area. Conversely, the processing module may be configured to modify the zone of interest to permit continued traversal of the area by the vehicle relative to the obstacle if both of the preceding conditions are satisfied but a determination has been made that the determined characteristics of the obstacle permit traversal of the area by the vehicle relative to the obstacle.

The processing module may be configured to modify the zone of interest so that the obstacle falls outside or on the boundary of the zone of interest.

The periphery generator module may be configured to generate a plurality of concentrically arranged zones of interest and to cause the processing module to take action depending on in which of the zones of interest the obstacle is detected. The periphery generator module may be configured to select a number of the concentrically arranged zones of interest and to cause the processing module to take action dependent on a number of criteria. The periphery generator module may select the number of zones of interest and their shape either from a library of preconfigured zones of interest or dynamically.

In an embodiment, the periphery generator module may be configured to generate a first, inner zone of interest about the vehicle and a second, outer zone of interest about the vehicle, the processing module being configured to take action regarding further passage of the vehicle depending on in which zone of interest the obstacle has been detected.

The processing module may be configured to generate an alarm condition if the detected obstacle is in the outer zone of interest and to cause the vehicle to cease further traversal of the area if the detected obstacle is within the inner zone of interest, in both cases, the obstacle further being within or on a boundary of the SWA.

The processing module is configured to control a vehicle controller of the vehicle to control traversal of the area by the vehicle.

The periphery generator module may, further, be configured to generate a bounding zone of interest to approximate a footprint of at least a predetermined part of the vehicle. The periphery generator module may alter a shape of the bounding zone of interest based on at least one of a characteristic of the obstacle detected and a change in a configuration of the vehicle. The periphery generator module may be configured to alter the shape of the bounding zone of interest either from a library of preconfigured zones of interest or dynamically.

The scanning arrangement may include at least one scanner mountable to the vehicle, the at least one scanner being operable to scan a region about the vehicle to assess the characteristics of the obstacle. The at least one scanner may be mountable to the vehicle to scan a region about the vehicle in a vertical orientation to generate a vertical cross-sectional representation of the obstacle.

The processing module may be configured to process the obstacle data output by the at least one scanner to generate at least one polygon representing the obstacle and its characteristics. The processing module may be configured to display the at least one polygon on a display associated with the vehicle and to display points of inflection relative to the at least one polygon. In this specification, unless the context clearly indicates otherwise, the term "points of inflection" is to be understood as points on the polygon representative of points of the topography of the obstacle where the topography of the obstacle changes shape, e.g. from an incline to a decline or from a flat to an incline or to a decline.

The processing module may be configured to use the obstacle data to determine whether or not the vehicle can safely traverse the obstacle.

The SWA may be implemented as an electronic representation of a boundary of the area, and in which the processing module includes a data store in which the SWA is stored. The electronic representation of the boundary may differentiate as to a type of obstacle defining the boundary.

The periphery generator module may be configured to generate the zone of interest depending on a direction of traversal of the vehicle with the zone of interest extending further from the vehicle in directions of traversal of the vehicle than in directions transverse to directions of traversal of the vehicle.

The disclosure extends also to a vehicle which includes a vehicle operating system as described above with reference to the second aspect of the disclosure.

The disclosure extends still further to a drill rig which includes a vehicle operating system as described above with reference to the second aspect of the disclosure.

In a third aspect, there is provided a method of operating a vehicle in an area in which obstacles are present, the method including scanning a region about the vehicle to detect whether or not an obstacle is present, the scanning occurring in a vertical orientation to generate a vertical cross-sectional representation of the obstacle; and if an obstacle is detected, scanning the obstacle to assess characteristics of the obstacle.

The "characteristics" of an obstacle include the type of obstacle, the height of the obstacle, the gradient or slope of the obstacle, or the like. Thee scanner may also be implemented to detect characteristics of topography behind the obstacle such as declines, sharp drop-offs, or the like and these characteristics are to be understood as being included in the term "characteristics of the obstacle".

The method may include displaying the scanned obstacle as at least one polygon representing the obstacle and its characteristics. Further, the method may include displaying points of inflection relative to the at least one polygon. In this specification, unless the context clearly indicates otherwise, the term "points of inflection" is to be understood as points on the polygon representative of points of the topography of the obstacle where the topography of the obstacle changes shape, e.g. from a level surface to an incline or a decline, from an incline to a decline, or the like. The method may include displaying the scanned obstacle as a plurality of two-dimensional polygons.

The method may include assessing the scanned obstacle to determine whether or not the vehicle can safely traverse the obstacle. Thus, the method may include assessing the scanned obstacle to determine at least one of the height and slope, or gradient, of the article.

In a fourth aspect, there is provided a vehicle operating system for operating a vehicle in an area in which obstacles are present, the system including a scanning arrangement mountable to the vehicle, the scanning arrangement being operable to scan a region about the vehicle to detect whether or not an obstacle is present and to output obstacle data, the scanning occurring in a vertical orientation to generate a vertical cross-sectional representation of the obstacle; and a processing module which is responsive to the obstacle data output by the scanning arrangement to assess characteristics of an obstacle detected by the scanning arrangement.

The processing module may be configured to implement the scanned obstacle as at least one polygon representing the obstacle and its characteristics and the system may include a display on which the at least one polygon is displayed. The processing module may be configured to display, on the display, points of inflection relative to the at least one polygon. The processing module may be configured to implement the scanned obstacle as a plurality two dimensional polygons.

The processing module may be configured to determine whether or not the vehicle can safely traverse the obstacle. Thus, the processing module may be configured to determine at least one of the height and slope, or gradient, of the article.

BRIEF DESCRIPTION OF DRAWINGS

Embodiments of the disclosure are now described by way of example with reference to the accompanying diagrammatic drawings in which.

DETAILED DESCRIPTION OF EXEMPLARY EMBODIMENTS

Figure 1:
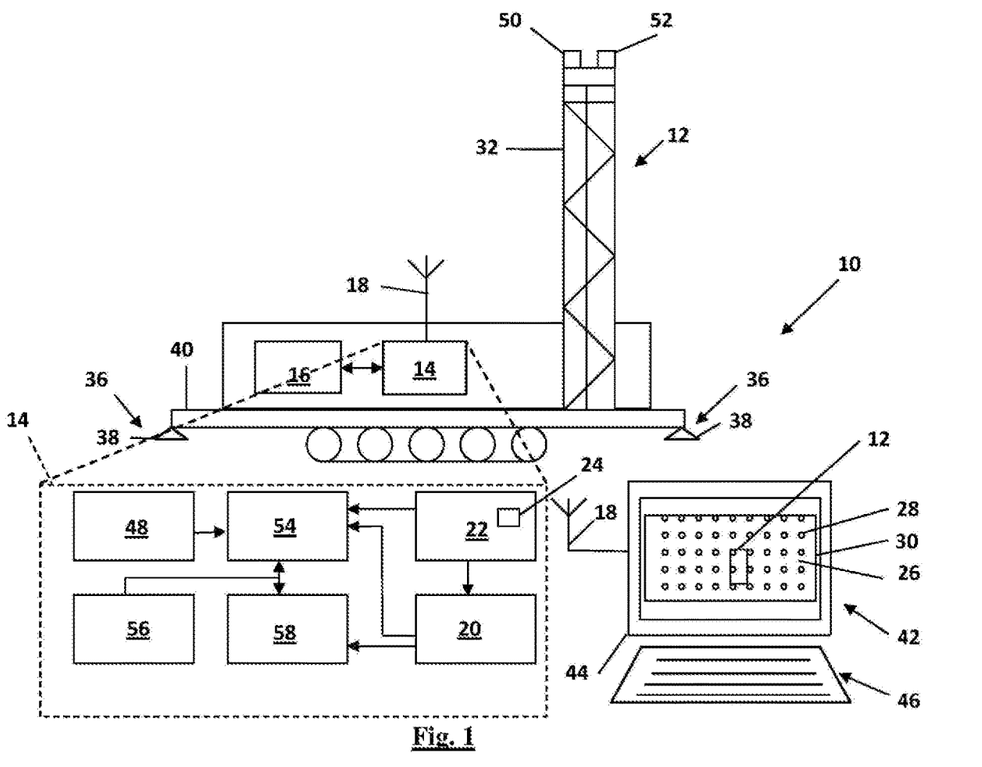
FIG. 1 shows a schematic representation of an embodiment of a vehicle operating system.

In FIG. 1 of the drawings, reference numeral 10 generally designates an embodiment of a vehicle operating system. The vehicle operating system 10 is intended for use in controlling the operation of remotely controlled or autonomously operated vehicles such as, for example, mobile mining machinery. While the vehicle operating system 10 has been developed particularly for use in controlling an autonomously operating drill rig 12, the vehicle operating system 10 can equally be used for controlling other mobile machinery such as, for example, autonomous haul trucks, autonomous explosives charging vehicles, or the like or even light vehicles operating autonomously. However, for ease of explanation, the disclosure will be described with reference to its application in controlling the operation of an autonomously operable drill rig 12. Further, the operating system 10 will be referred to below as a drill rig operating system.

The drill rig operating system 10 includes a drill automation system (DAS) 14 and a drill rig controller 16 mounted on the drill rig 12. The DAS 14 and the drill rig controller 16 communicate with each other either wirelessly or via a wired connection. The DAS 14, in turn, communicates with a user interface 42 of a remote operator station wirelessly via antennas 18.

Figure 2:
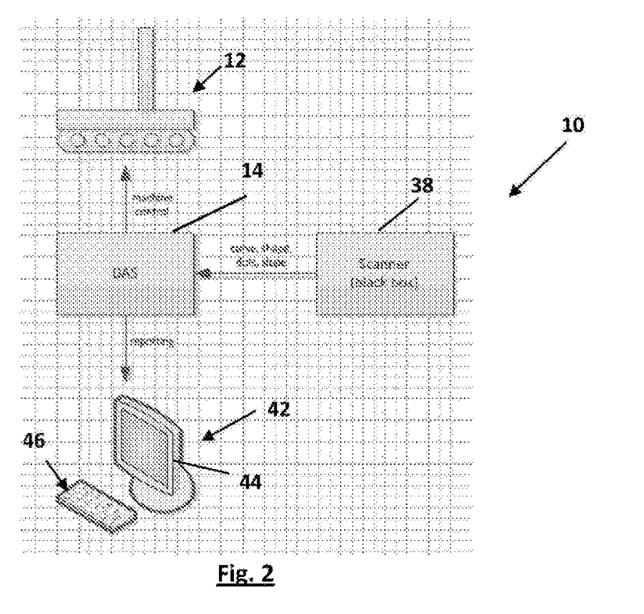
FIG. 2 shows a schematic block diagram of the vehicle operating system.

A detailed block diagram of the DAS 14 is shown in FIG. 1 of the drawings. The DAS 14 includes a processing module 20, including a data store, which communicates with a periphery generator module 22. The periphery generator module 22 includes a position determining module 24 for determining a position of the drill rig 12 in an area such as a bench 26 of an open cut mine in which the drill rig 12 is operating to drill blast holes 28 in the bench 26. A safe working area (SWA) 30 is defined on the bench 26 and data relating to the SWA 30 (referred to as "SWA data") are input into the DAS 14.

The periphery generator module 22 is operable to generate a periphery of a zone of interest, or obstacle detection zone (ODZ), 34 (FIGS. 3-5) about the drill rig 12, relative to a predetermined portion of the drill rig 12. The predetermined portion of the drill rig 12 may, for example, be a centre of a drill string suspended from a drill mast 32 (FIG. 1) of the drill rig 12. The predetermined portion could, instead, be the centre of the drill rig 12, its centre of gravity, its centre of mass, a corner of the drill rig 12, or the like. The periphery generator module 22 outputs zone data, or ODZ data, to the processing module 20. It is to be noted that, while the periphery generator module 22 and its ancillary module 24 have been shown as discrete modules, the modules 22 and 24 could be implemented in software and form part of the processing module 20.

The drill rig operating system 10 further includes a scanning arrangement 36 mounted on the drill rig 12. The scanning arrangement 36 comprises a plurality of individual scanners 38 carried on a platform 40 of the drill rig 12 to scan an area or region about the drill rig 12. As an example, a scanner 38 may be arranged at, or close to, each corner of the platform 40 of the drill rig 12.

In the illustrated embodiment, each scanner 38 is a commercially available scanner which scans a region relative to the drill rig in a vertical plane to assess the presence of obstacles and, should an obstacle be detected, to assess characteristics of that detected obstacle, as will be described in greater detail below. Examples of suitable scanners 38 include a SICK Stegmann LMS 5xx scanner or a SICK Stegmann LMC 1xx scanner. These types of scanners are available from SICK Stegmann GmbH, Dürrheimer Str. 36, 78166, Donaueschingen, Germany. It will, however, be appreciated that other scanners could be used instead and, if desired, bespoke scanners could be implemented. Further, instead, or in addition, the scanner could be imaging radar, a line scanner, a 3d scanner, or the like.

An output from each scanner 38 is processed by an associated processor (not shown) to generate obstacle data in the form of cloud points of data relating to the type of obstacle, obstacle edges, gradients, height, etc.

The obstacle data are fed to the processing module 20 of the DAS 14 and, in turn, via the antennas 18 to the user interface 42 of the operating system 10. The processing module 20 interprets the received obstacle data to determine the type of obstacle such as an edge, a windrow, a power trough, a face or wall, a boulder, or the like. The aforementioned obstacles are, generally, geographical features. An "obstacle" could also be another vehicle, personnel, a structure, or the like Accordingly, in this specification, the term "obstacle" is to be understood to include both geographical and non-geographical impediments to the vehicle.

The user interface 42 includes a display 44 on which, inter alia, obstacle data are displayed as will be described in greater detail below. The user interface 42 further has various inputting devices, such as a keyboard 46, pointing devices (not shown), or touchscreen facilities on the display 44 which are operated by an operator maintaining oversight over the operation of the autonomously operating drill rig 12.

The DAS 14 includes a navigation unit 48. The navigation unit 48 receives data from various input devices and/or sensors for determining the location of the drill rig 12 on the bench 26 with accuracy. The drill rig 12 includes a GPS unit 50 which, for example, is a high precision GPS (HPGPS) unit, one or more video cameras 52 and other position determining systems such as wheel encoders, laser scanners, or the like. Data from the various input devices and/or sensors are transmitted to the navigation unit 48 of the DAS 14. The navigation unit 48 determines the location of the drill rig 12 from the navigational data received from the input devices and/or sensors and provides this location information to the processing module 20 and to the position determining module 24 of the periphery generator module 22.

Data from the navigation unit 48 are also made available to a tramming control module 54 of the DAS 14. The tramming control module 54 is used for the automated tramming of the drill rig 12 on the bench 26.

Still further, the DAS 14 includes a safety module 56. The safety module 56 is responsible for monitoring the status of the drill rig 12, detecting possible collisions and detecting and interpreting the obstacle data and the traversal or avoidance of any detected obstacle by the drill rig 12.

The DAS 14 includes a manual control module 58 for enabling the operator to override autonomous control of the drill rig 12 and to assume manual control of the drill rig 12. Manual control can either be effected from a cabin of the drill rig 12 (where the drill rig 12 includes such a cabin) or via remote control.

Figure 3:
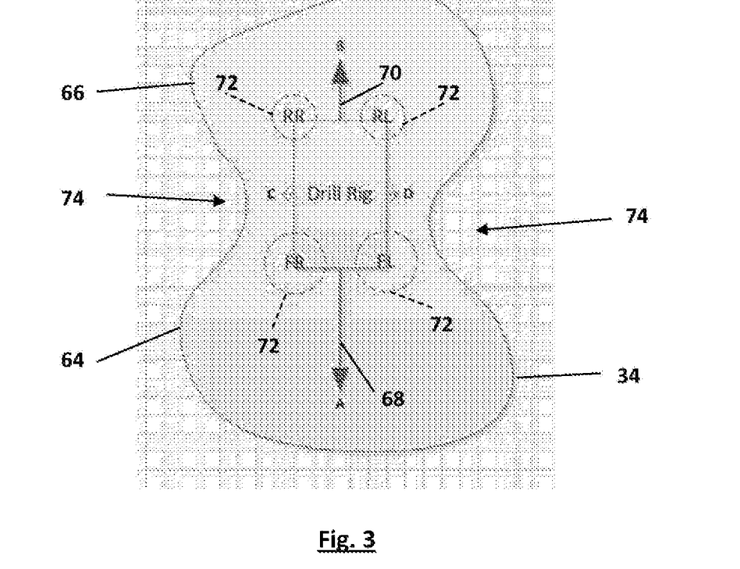
FIG. 3 shows a schematic representation of a zone of interest, or obstacle detection zone (ODZ), generated about a periphery of the vehicle being operated.

The ODZ 34 is shown in FIG. 3 as a single zone of interest. It will, however, be appreciated that the ODZ 34 could comprise a plurality of concentrically arranged ODZs surrounding the drill rig 12. The exact number of concentrically arranged ODZs selected as well as the action to be taken by the DAS 14 if an obstacle is detected in a particular ODZ depends on a number of criteria.

These criteria include vehicle type (for example the drill rig 12, a haul truck, a light vehicle, etc.), current mode of operation of the vehicle (for example drilling, tramming, hauling, or the like), current speed of vehicle, characteristics of an area in which the vehicle is operating and the surrounding environment (for example a mine site, a road, an automated zone of a mine site, a mixed human-automated zone of a mine site, or the like), environmental conditions (for example weather conditions, air quality conditions, or the like), safety protocols, time of day of operation of the vehicle, etc. This list of criteria is exemplary and not exhaustive.

Further, the size, shape and number of the ODZs is selected either from a library of preconfigured zones of interest or dynamically according to a predetermined algorithm or set of rules. It will also be appreciated that, although the ODZs are concentrically arranged, they need not all have the same shape as one another either when selected or after any one or more of the ODZs has been modified, as described below. Also, the action to be taken by the DAS 14 when an obstacle is detected in any one of the ODZs may differ from one ODZ to the next.

Figure 4:
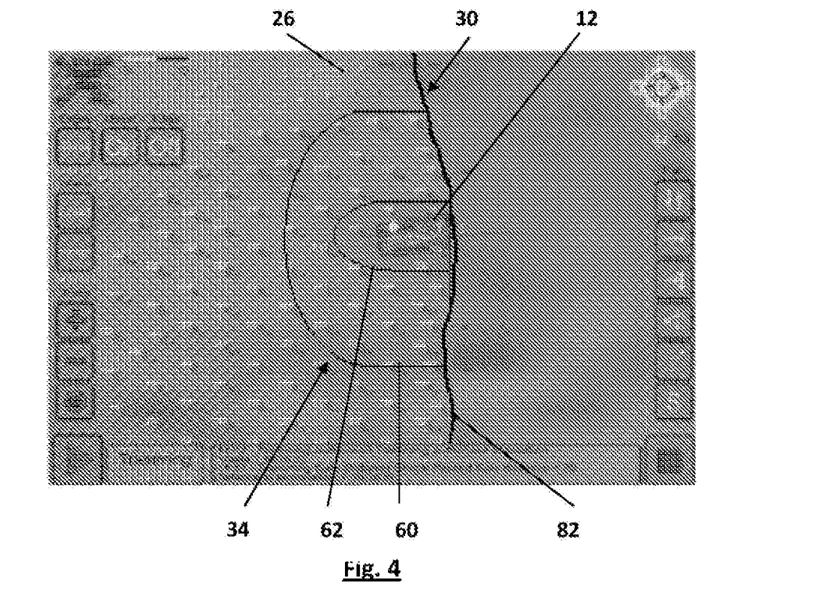
FIG. 4 shows a screenshot of a first example of varying the ODZ in respect of a first type of obstacle detected by the vehicle.
Figure 5:
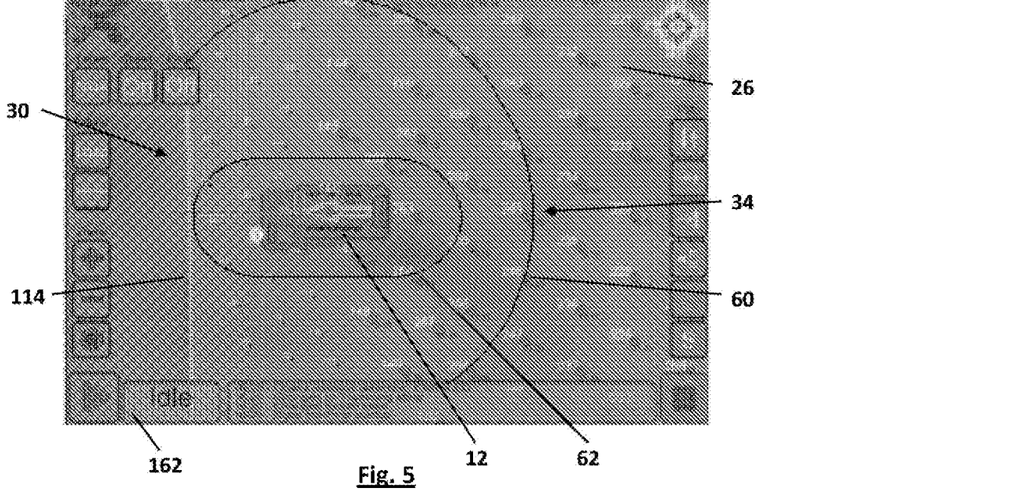
FIG. 5 shows a screenshot of a second example of varying the ODZ in respect of a second type of obstacle detected by the vehicle.

FIGS. 4 and 5 show an embodiment where the ODZ 34 is made up of an outer ODZ 60 and an inner ODZ 62. The action taken by the DAS 14 differs depending on, whether an obstacle is detected in either the outer ODZ 60 or the inner ODZ 62. More particularly, as will be described in greater detail below, when an obstacle is detected in the outer ODZ 60, a discernible alarm is generated at the user interface 44 to alert an operator to the detection of the obstacle but the drill rig 12 is still able to traverse or tram on the bench 26 under the control of the DAS 14. The discernible alarm is either an audible alarm, a visual alarm or, preferably, both. However, when the obstacle is detected within the inner ODZ 62, and the DAS 14 interprets data associated with that obstacle to be an obstacle of the type which cannot be traversed by the drill rig 12, the processing module 20 causes a signal to be sent to the drill controller 16 to cause the drill controller 16 to trigger an automated response. One such automated response is to power down the drill rig 12. Powering down of the drill rig 12 stops tramming of the drill rig 12 on the bench 26 and places the drill rig 12 in an idle state. Another automated response may be the refusal by the drill controller 16 to respond to or to continue to respond to a command from the operator. It will be appreciated that other automated responses may be implemented.

The inner ODZ 62 typically extends about 5 m from the centre of the drill rig 12 as measured through a longitudinal axis extending through the drill mast 32 of the drill rig 12. The outer ODZ 60 has dimensions in the range from about 30 m to about 50 m as measured through the longitudinal axis extending through the drill mast 32.

While the ODZs 60 and 62 have been shown as having elliptical shapes in FIGS. 4 and 5 of the drawings, the ODZ 34 could have a more irregular shape that best characterises a safety zone about the vehicle. In the described embodiment, the ODZ has an irregular, "peanut" shape as shown in FIG. 3 of the drawings. Thus, the ODZ 34 has more bulbous end portions 64 and 66 to take into account relatively rapid changes in translational movement of the drill rig 12 in a forward direction 68, a rearward direction 70 and at each corner 72 for rotational movement of the drill rig 12. Conversely, the ODZ 34 has a narrower, waisted region 74 along each side of the drill rig 12 as it is not possible for the drill rig 12 to effect lateral translational movements. The periphery generator module 22 alters the ODZ 34 dynamically so that, for example, as shown in FIG. 3 of the drawings, the bulbous portion 64 is larger than the bulbous portion 66 being the direction of current traversal of the drill rig 12. In the case of other types of vehicles, the ODZ 34 may adopt other shapes.

Figure 6:
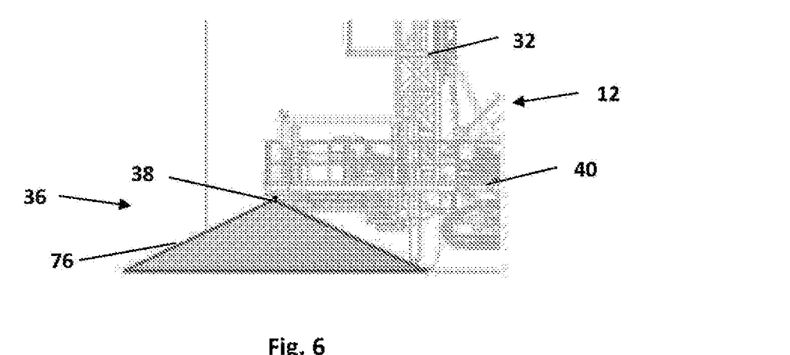
FIG. 6 shows an embodiment of a scanning zone of a scanner mounted on the vehicle.

The processing module 20 is further configured to modify the shape of the ODZ 34, whether the outer ODZ 60 only or both the outer ODZ 60 and the inner ODZ 62, depending on the type and the characteristics of the obstacle encountered by the drill rig 12. Assessing the type and characteristics of the obstacle detected by any one of the scanners 38 is now described with reference to FIGS. 6-13 of the drawings. As shown in greater detail in FIG. 6 of the drawings, each scanner 38 generates a scanning cone 76 to obtain data relating to a vertical cross-section of the obstacle such as a windrow 78 shown in FIG. 7 of the drawings. The windrow 78 is arranged adjacent an edge 80 of the bench 26 beyond the SWA 30 associated with the bench 26. In the illustrated embodiment, the windrow 78, itself, forms one of the boundaries 82 of the SWA 30 as shown in FIG. 4 of the drawings.

As indicated above, each scanner 38 is mounted at, or close to, a corner of the platform 40 of the drill rig 12 to provide a visualisation of a vertical slice of topography of the bench 26 in close proximity to the drill rig 12 and, in particular, the topography in the direction of traversal or tramming of the drill rig 12 on the bench 26.

Figure 7:
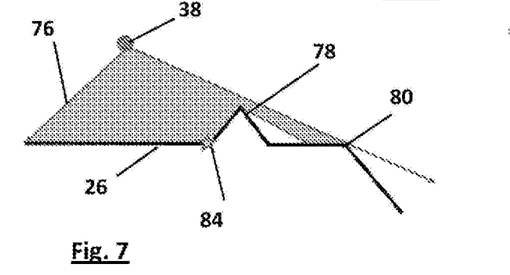
FIG. 7 shows a schematic representation of an obstacle scanned by one of the scanners mounted on the vehicle.

The scanning processor of the scanning arrangement 36 interprets raw scanner data using a mathematical algorithm to determine points of inflection, such as shown at 84 in FIG. 7 of the drawings, where there is a change in topography ahead of the drill rig 12. The locations of such points of inflection 84 are used to generate a depiction of the obstacle (in this case, the windrow 78) to be used in the DAS 14. The types of changes in topography recorded by the scanning processor of the scanning arrangement 36 include changes from a flat or level surface to an incline or a decline, a change from an incline to a decline, or the like.

Further, the scanning arrangement 36 is provided with an appropriate application programming interface (API) which interfaces the scanning data from the scanners 38 to the DAS 14. The API provides data regarding the configuration of each scanner 38, calibration of a position of the scanner 38 with respect to its physical location on the platform 40 of the drill rig 12 as well as calibration of the position of the scanner 38 with respect to its position relative to a centre of the drill string suspended from the drill mast 32 of the drill rig 12.

Each scanner 38 is also suitably mounted, for example, gimbal mounted, on the platform 40 so that the scanner 38 can compensate for tilt conditions of the drill rig 12 always to scan in a substantially vertical orientation. Each scanner 38 is therefore coupled to a gimbal (not shown) which, in turn, is operated in accordance with an output from a tilt sensor of the drill rig 12. The tilt sensors detect an instantaneous tilt angle of the drill rig 12 and the gimbals are operated to compensate for tilt of the drill rig 12 to keep the scanners 38 level.

Figure 8:
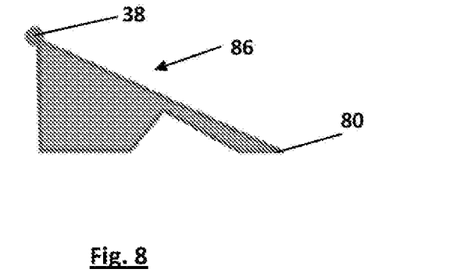
FIG. 8 shows a depiction of a two-dimensional polygonal representation of an obstacle scanned by the scanner as displayed on a display of the vehicle operating system.

Each scanner 38 generates 2D or 3D point cloud-type data for visualisation on the display 44 of the user interface 42. More particularly, this point cloud type data generates a 2D polygon 86 (FIG. 8) which is displayed on the display 44 and provides a visualisation of the topography ahead of the drill rig 12 to the operator having oversight of the operation of the drill rig 12. The 2D polygon 86 is also used by the processing module 20 of the DAS 14 to assess the obstacle 78 and its characteristics such as its height and gradient or slope.

Figure 10:
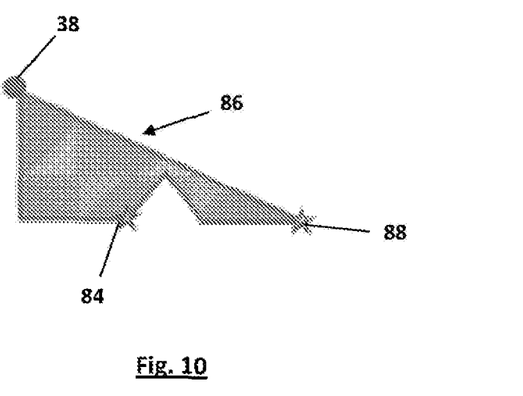
FIG. 10 shows a depiction of a two-dimensional polygonal representation of the obstacle of FIG. 9 highlighting the multiple edges as displayed on the display of the vehicle operating system.

The polygon 86 further provides an indication to the DAS 14 of the edge 80 of the bench 26 so that the DAS 14 in effect provides "situational awareness" to the drill rig 12 and its position relative to the obstacle 78 and the edge 80 of the bench 26. This is shown as a point of inflection 88 in FIG. 10 of the drawings. The API of the scanning arrangement 36 is also operable to determine the distance from the edge 80, as measured from the point of inflection 88, to the centre of the drill string of the drill rig 12, or any other selected portion of the drill rig 12, and to make that data available to the DAS 14.

In addition, the API of the scanning arrangement 36 effects fault or error state reporting and includes detection of degradation in the performance of the associated scanner 38 due to environmental conditions, for example, dirt on a lens of the scanner 38, etc.

It is noted that the API of the scanning arrangement 36 does most of the processing of the raw scanner data prior to feeding the obstacle data to the DAS 14. This reduces communication bandwidth requirements between the DAS 14 of the drill rig 12 and the user interface 42 at the remote operator station.

Figure 13A:
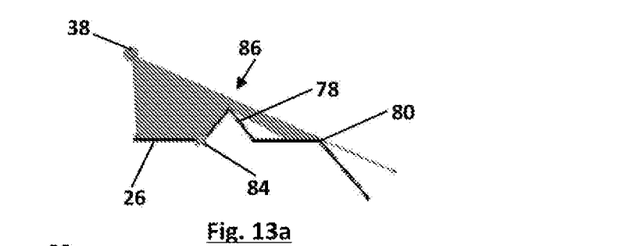
FIGS. 13a-13e show depictions of two-dimensional polygonal representations of different types of obstacles which may be encountered by the vehicle

FIGS. 13a-13e show different obstacles with their associated polygons being shown as shaded regions relative to those obstacles. Thus, FIG. 13a is, in effect, a repetition of FIG. 7 showing the windrow 78 and edge 80 of the bench 26 and the associated polygon 86.

Figure 9:
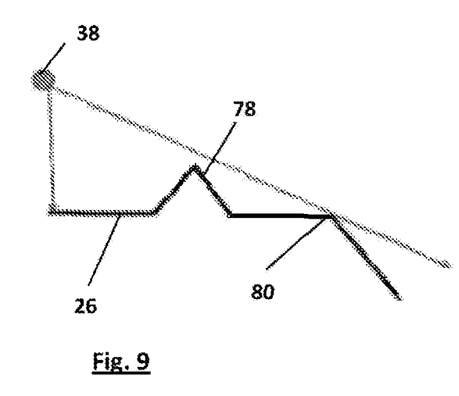
FIG. 9 shows a schematic representation of a similar obstacle to that of FIG. 7 but taking into account multiple edges.
Figure 13B:
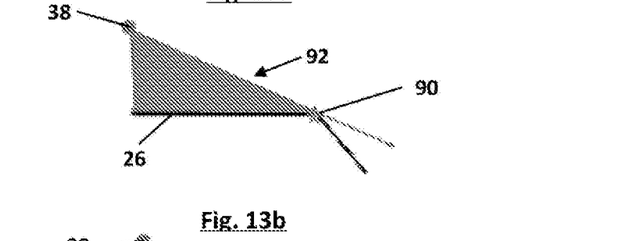
Figure 13C:
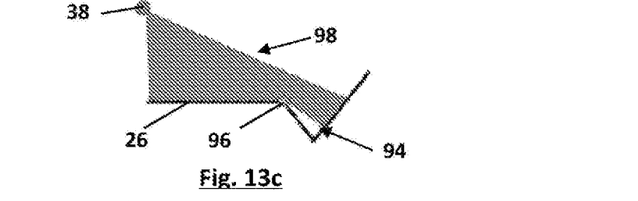
Figure 13D:
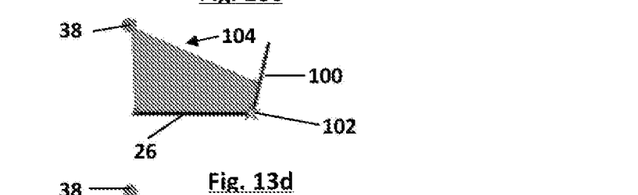
Figure 13E:
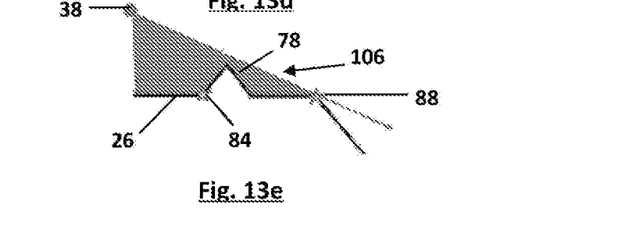

FIG. 13b shows an example of an open face edge shown by the point of inflection 90 and the associated polygon 92. FIG. 13c shows a power trough edge 94 and its associated point of inflection 96 and polygon 98. FIG. 13d shows a bench wall toe of a bench wall 100 with the associated point of inflection 102 and polygon 104. FIG. 13e is a similar representation to that shown in FIGS. 9 and 10 of the drawings showing multiple edges detected by the scanner 38, being the edge of the windrow 78 and the edge 80 of the bench 26 as represented by the points of inflection 84 and 88, respectively. These multiple edges have a polygon 106 associated with them.

It will be appreciated that the drill rig 12 has a number of components suspended from the platform 40 which may be susceptible to damage if they are struck by an obstacle. Examples of these components include lights, cameras and dust skirting mounted below the platform 40. This equipment may be damaged should the drill rig controller 16 need to tram the drill rig 12 over an obstacle such as the windrow 78.

Figure 11:
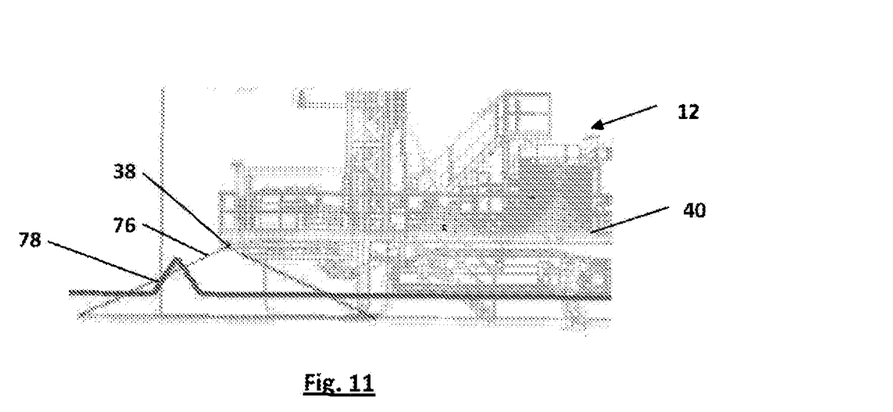
FIG. 11 shows a schematic representation of the operation of the scanner mounted on the vehicle in assessing characteristics of a detected obstacle.

Part of the operation of the drill rig operating system 10 includes determining characteristics of an obstacle such as the windrow 78 represented in FIG. 11 of the drawings. Also, in other situations, while the obstacle may have a reasonably low height 'h' (FIG. 12), a gradient or slope of the obstacle may be too steep rendering passage past the obstacle problematic for the drill rig 12.

Figure 12:
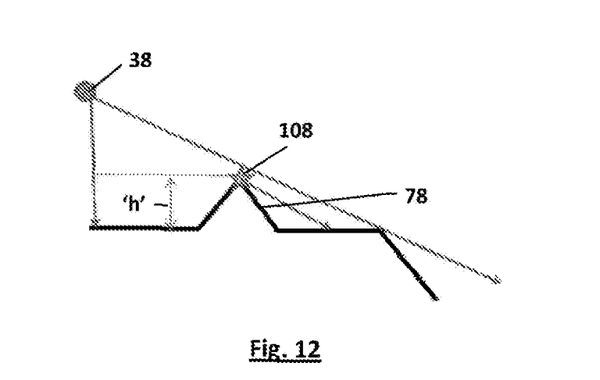
FIG. 12 shows a schematic representation of the operation of the scanner in assessing the height of the obstacle.

Thus, as shown in FIG. 12 of the drawings, the scanner 38 assesses characteristics such as the height 'h' and the gradient of the obstacle, in this case, the windrow 78. In addition, the scanner 38 determines the point of inflection 108 at the "peak" of the windrow 78 to generate, for example, the polygon 86 shown in FIG. 13a of the drawings.

Raw data from the scanner 38 are used to give a rolling estimation of obstacle height ahead of the drill rig. The data output from the API are interfaced with the DAS 14. Thus, when an obstacle of a significant height is detected by any one of the scanners 38 then predetermined responses are actioned by the DAS 14. These actions may include stopping tramming of the drill rig 12 or, where circumstances permit, removing or repositioning vulnerable components suspended below the platform 40. For example, the dust skirting may be raised to allow traversal of the drill rig 12 relative to the detected obstacle. In addition, or instead, the DAS 14 may raise an alarm when an obstacle having undesirable characteristics is detected.

Figure 14:
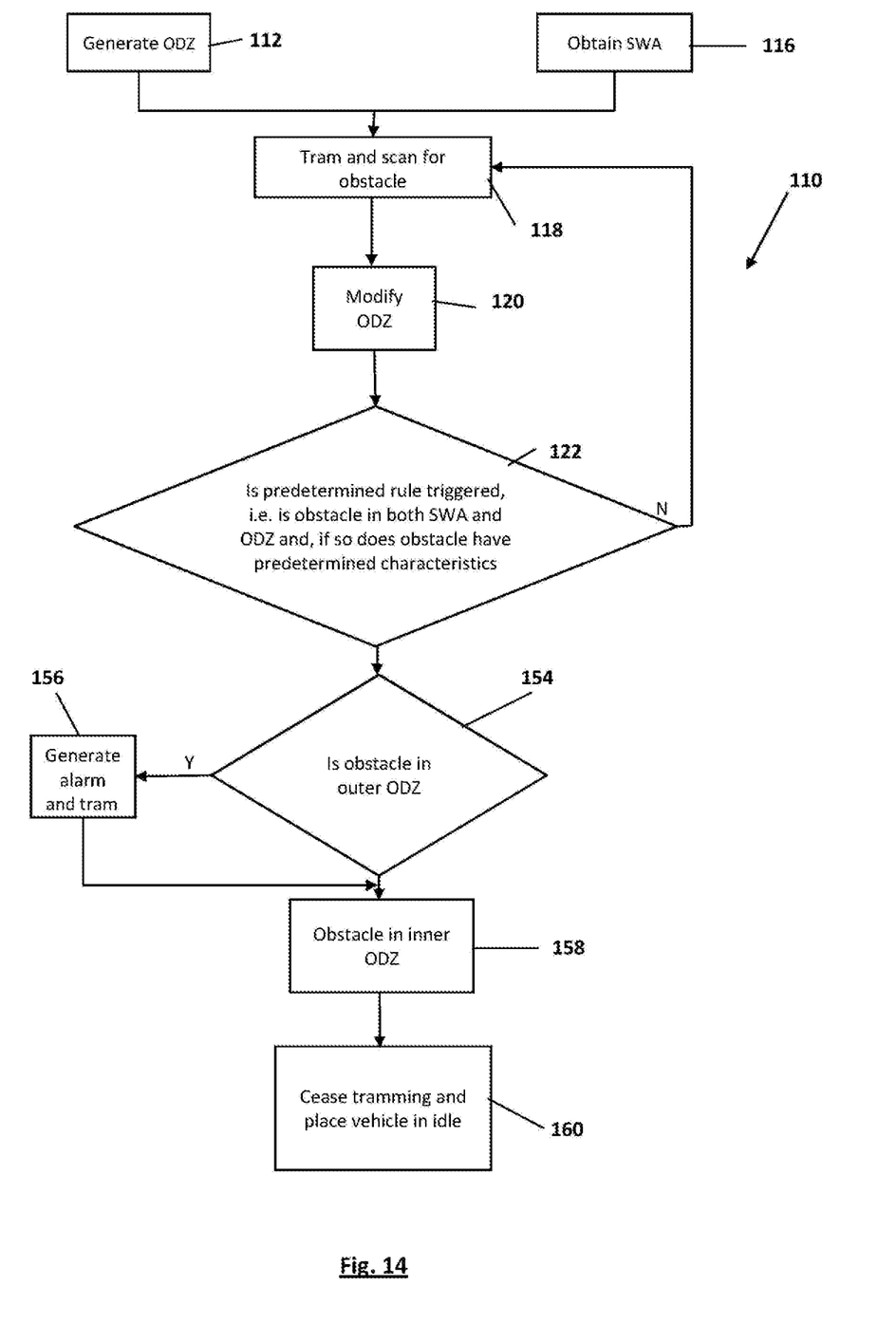
FIG. 14 shows a flow chart of a first embodiment of a method of operating a vehicle.

Referring now to FIG. 14 of the drawings, a flow chart of an embodiment of a method of operating the drill rig 12 is described and is designated generally by reference numeral 110. At 112, the periphery generator module 22 of the DAS 14 generates the ODZ 34, whether a single ODZ or multiple ODZs 34 such as the ODZ 34 having an outer ODZ 60 and an inner ODZ 62.

The SWA 30 is pre-configured by mine personnel depending on the characteristics associated with the bench 26. Thus, as described above, part of the bench has a windrow 82 forming a section of the SWA 30. As shown in FIG. 5 of the drawings, another part of the SWA 30 is constituted by a high wall 114. The data relating to the SWA 30 are input into the processing module 20 of the DAS 14 as shown at 116. Once these data have been loaded into the DAS 14, the drill rig 12 operates autonomously on the bench 26 to drill the blast holes 28.

To date, one of the problems associated with autonomously operating a drill rig on a bench of a mine, is that there is too much uncertainty associated with allowing a drill rig to approach the edge while operating in an autonomous mode to drill blast holes at the edges of the SWA (the so-called "edge holes"). As a result, when a drill rig approaches the edge of the SWA in order to drill the edge holes, autonomous control of the drill rig ceases and an operator is required to assume control of the drill rig to control tramming of the drill rig to drill the edge holes using position detecting equipment of the drill rig augmented by video images provided by cameras on the drill rig. This is problematic as it reduces the drilling efficiency of the drill rig.

With the provision of the ODZ 34 and the SWA 30 as well as the provision of the scanners 38 on the drill rig 12, the drill rig 12 is able to tram autonomously in a more reliable and safer manner on the bench 26. Tramming of the drill rig 12 is shown at 118 in FIG. 14 of the drawings.

A further problem associated with detecting obstacles is that, due to the size and shape of the obstacle, the obstacle may fall outside the SWA 30. However, the scanners 38 may still detect that the obstacle is of significance and generate obstacle data which are interpreted by the DAS 14 as being problematic and causing the DAS 14 to cease tramming of the drill rig 12 and placing it in an idle mode. Once again, these false positives reduce the operating efficiency of the drill rig 12 and require operator intervention.

While the drill rig 12 is tramming, the DAS 14 therefore monitors the shape of the ODZ 34. If the DAS 14 determines that the periphery of the ODZ 34 extends beyond that of the SWA 30, the DAS 14 modifies the shape of the ODZ 34 so that the relevant portion of the periphery of the ODZ 34 conforms to that of the SWA 30 as shown at 120.

In an embodiment, modifying the shape of the ODZ 34 involves morphing its shape to coincide with that of the SWA 30 and is dependent on the type of obstacle detected. Morphing of the shape of the ODZ 34 is done under the control of the periphery generator module 22 in combination with the position determining module 24. It will be appreciated that the position determining module 24 determines the position of the drill rig 12 relative to the obstacle and morphs the ODZ 34 accordingly.

In another embodiment, modifying the shape of ODZ 34, involves selecting an ODZ 34 from a library of ODZs stored in the data store of the processing module 20.

As shown at 122, the DAS 14 determines whether or not a predetermined rule has been triggered. This predetermined rule is a determination as to whether or not the detected obstacle is both within the ODZ 34 associated with the drill rig 12 as well as in the SWA 30 or at least on the boundary of the SWA 30. If the DAS 14 determines that either one of these conditions is not satisfied, a null result is output and the drill rig 12 continues tramming. In other words, the DAS 14 uses a logic AND operation and, unless a logic '1' is generated, tramming of the drill rig 12 continues.

Further, if a logic '1' is generated, the predetermined rule then involves the DAS 14 making a determination as to whether or not the detected obstacle has predetermined characteristics which would be detrimental to further tramming of the drill rig 12.

Figure 15:
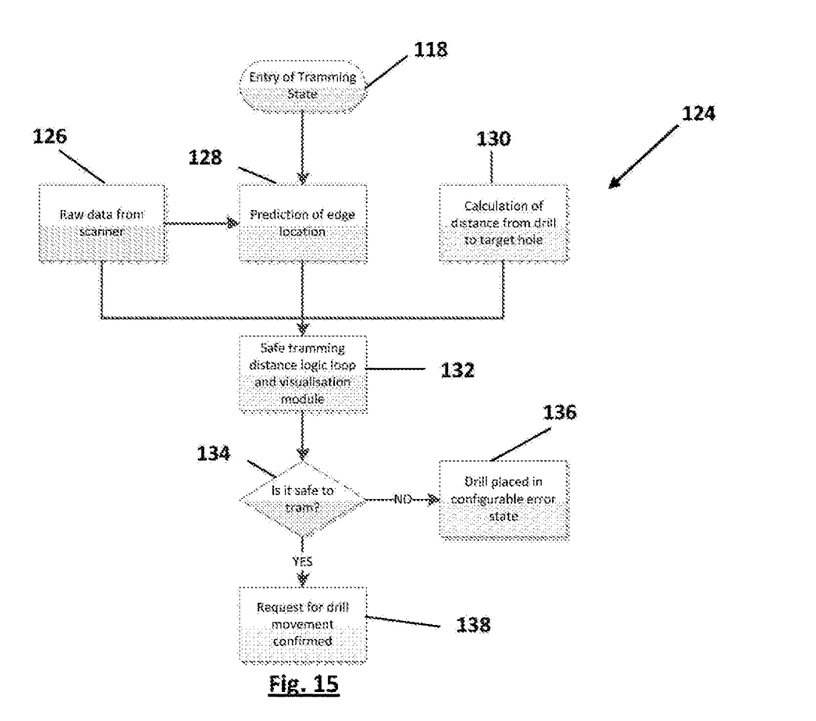
FIG. 15 shows a flow chart of a further embodiment of a method of operating a vehicle.

A flow chart of one of the routines to determine the characteristics of the obstacle is shown in FIG. 15 of the drawings and is designated generally by the reference numeral 124. Raw data from the scanner 38 are input as shown at 126 and a prediction of an edge location such as the edge 80 is made at 128. In addition, the DAS 14 determines the distance from the drill string to a target edge hole as shown at 130.

The DAS 14 then implements a safe tramming distance logic loop as shown at 132 to determine if it is safe for the drill rig 12 to continue tramming as shown at 134. The safe tramming distance logic loop 132 uses the data from the scanners 38 to determine the distance to the edge 80, the characteristics of the intervening windrow 78, etc. More particularly, the safe tramming distance logic loop uses the data generated by the scanning arrangement 36 and, in particular, the relevant 2D polygon which has been generated to assess the type of obstacle that has been detected and the characteristics associated with that obstacle.

If a determination is made that it is not safe to tram, the DAS 14 places the drill rig 12 in an idle mode as shown at 136. Conversely, if a determination is made that it is safe for the drill rig 12 to continue tramming, any request from the drill rig controller 16 to continue tramming is granted as shown at 138.

Figure 16:
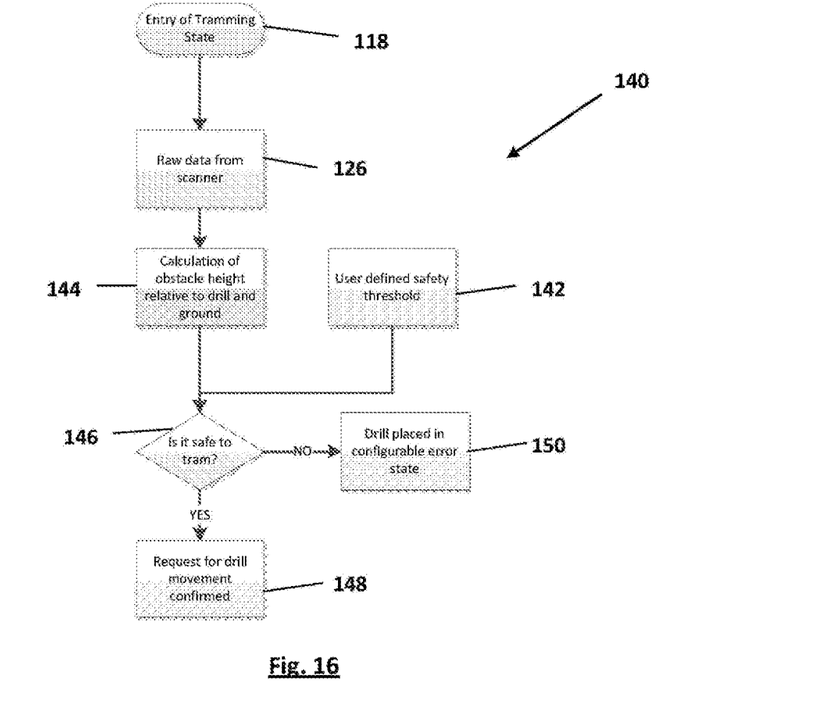
FIG. 16 shows a flow chart of yet a further embodiment of a method of operating a vehicle.

The preceding routine deals with situational awareness determination of the drill rig 12 relative to the edge 80 of the bench 26. FIG. 16 shows a flow chart of a further routine 140 dealing with determination of the height 'h' of an obstacle such as the windrow 78 of FIG. 12 of the drawings. With reference to previous drawings, like reference numerals refer to like parts, unless otherwise specified.

As shown at 142, user-defined safety thresholds are entered into the DAS 14. These user-defined thresholds relate to the type and dimensions of equipment suspended from the platform 40 of the drill rig 12. Once an obstacle has been detected and the obstacle data relating to that obstacle has been supplied to the DAS 14, the DAS 14 determines the height 'h' of the obstacle relative to the drill rig 12 and to the surface of the bench 26 as shown at 144.

The DAS 14 then makes a determination whether or not it is safe to continue to tram as shown at 146. The DAS 14 makes this determination by comparing the determined height 'h' of the detected obstacle with the extent to which the suspended equipment extends below the platform 40 of the drill rig 12. If it is safe to tram, any request by the drill rig controller 16 to continue tramming is granted as shown at 148. If the DAS 14 determines, based on the user-defined safety thresholds and the calculation of the obstacle height, that it is not safe to tram, the drill rig 12 is placed in an idle state as shown at 150.

In the example shown in FIG. 4 of the drawings, the edge 82 of the SWA 30 is demarcated by a windrow, such as the windrow 78 illustrated in FIG. 7 of the drawings. Assuming the windrow 78 is of a sufficiently low height that it would not damage equipment suspended from the platform 40 of the drill rig 12, the DAS 14 allows the drill rig 12 to tram partially over the windrow 78 so that an edge hole of the blast hole pattern can be drilled adjacent the edge 82 of the SWA 30

In the example shown in FIG. 5 of the drawings, an edge 114 of the SWA 30 is in the form of a toe of a high wall adjacent the bench 26. The DAS 14 determines if the obstacle is in the outer ODZ 60 as shown at 154 in FIG. 14. The DAS 14 morphs the outer ODZ 60 as shown in FIG. 5 of the drawings to enable the drill rig 12 to continue tramming reliably and safely, but under an alarm condition, as shown at 156, until the inner ODZ 62 encounters the obstacle as shown at 158. When this occurs, the DAS 14 causes the drill rig 12 to cease tramming and the drill rig 12 is placed in an idle mode as shown at 160 in FIG. 14 of the drawings and at 162 in FIG. 5 of the drawings.

Figure 17:
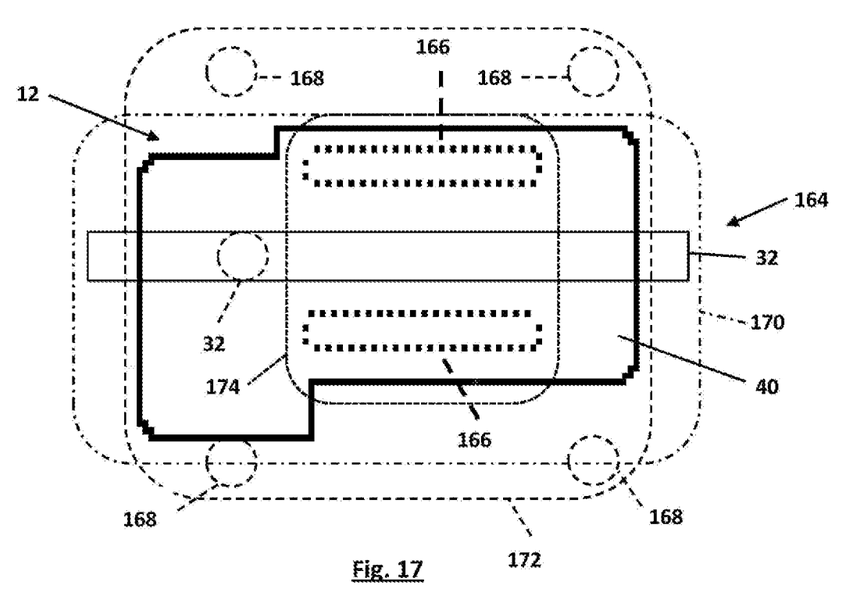
FIG. 17 shows a schematic representation of a bounding zone arrangement associated with the vehicle.

A further feature of the system 10 is the use of a vehicular zone of interest indicated generally by the reference numeral 164 in FIG. 17 of the drawings generated by the periphery generator module 22 of the DAS 14. This zone of interest 164 is a bounding zone of interest, or bounding zone, which approximates a footprint of the drill rig 12 or at least a portion of the drill rig 12 and which changes based on a number of factors. These factors include the type of obstacle detected to be in in proximity to the drill rig 12, a change in configuration of the drill rig 12, or the like. By "configuration" is meant the overall shape of the drill rig 12 when viewed in plan.

The drill rig 12 is a tracked vehicle having a pair of laterally spaced tracks 166 arranged beneath the platform 40. Further, the drill mast 32 is pivotally arranged on the platform 40. Thus, the drill mast 32 is pivotally displaceable between the operative position shown in FIG. 1 of the drawings where the drill mast 32 extends substantially perpendicularly to the platform 40 and a stowed, inoperative position where the drill mast 32 overlies and extends parallel to the platform 40 as shown in FIG. 17 of the drawings.

Still further, when the drill rig 12 is in a drilling configuration, stabiliser pads 168 are extended from the platform 40 to engage a surface of the bench 26 to stabilise the drill rig 12 during the drilling operation. These stabiliser pads 168 protrude beyond the periphery of the platform 40 as shown in an exaggerated manner in FIG. 17 of the drawings. It will therefore be appreciated that the shape of the footprint of the drill rig 12 changes depending on the orientation of the drill mast 32 relative to the platform 40 as well as to whether or not the stabiliser pads 168 are in an extended or a retracted position.

The bounding zone 164 effectively demarcates a physical outline of the drill rig 12 and correlates with the current shape of the footprint of the drill rig 12. Unlike the ODZ 34, the bounding zone 164 is not modified in relation to the SWA 30 to fit the SWA 30. Instead, the bounding zone 164 is modified dependent on the configuration of the drill rig 12 and/or the type of obstacles in the vicinity of the drill rig 12.

Thus, in one example, when the drill rig 12 is tramming with its drill mast 32 in its inoperative, substantially horizontal, orientation, the drill mast 32 protrudes beyond the ends of the platform 40 as shown in FIG. 17 of the drawings. The bounding zone 164 is modified to take this into account as shown by the bounding zone 170 which encompasses the drill mast 32 within its periphery.

When the drill rig 12 is stationary and is in a drilling configuration with the stabiliser pads 168 extended from the platform 40, the bounding zone 164 is modified to encompass the stabiliser pads 168 within its periphery as shown by the bounding zone 172, It will be appreciated that the bounding zones 170 and 172 effectively operate as safety barriers about the drill rig 12. Other vehicles or personnel encroaching on the bounding zone 170 or 172, as the case may be, may cause an alarm to be generated at the user interface 42 enabling an operator to take remedial action.

In a further example, as described above, when the drill rig 12 is to drill an edge hole in the bench 26, it is permissible for the drill rig 12 to be trammed so that a portion of the drill rig 12 extends beyond the edge 82 of the bench 26 to overhang the edge 82. In such circumstances, the bounding zone 164 is modified merely to encompass the tracks 166, and any other relevant ground engaging elements, if applicable, of the drill rig 12 as shown by the bounding zone 174.

The bounding zones 164 are either selected from a library of pre-configured bounding zones 164 stored in the data store of the processing module 20 or, instead, are dynamically generated using an algorithm of the processing module 20. In addition, what has been set out above applies to a drill rig. For other vehicles, the bounding zone 164 changes dependent on the operational characteristics of the vehicle, its situational orientation and surrounding obstacles. For example, the bounding zone of a haul truck could be selected to take into account the position of the haul truck relative to a loading bucket of a loader.

It will be appreciated that the drill rig operating system 10 merges data from various inputs to enable a more educated or intelligent analysis of the drill rig's surroundings to be carried out. In particular, output data from the scanners 38 are analysed together with positional information such as that from the HPGPS 50. Output data, themselves, from the scanners 38 are only able to indicate that an obstacle has been detected and, if that obstacle is not stationary, to indicate relative movement between the obstacle and the drill rig 12. However, the scanner data are not able, alone, to indicate whether it is the drill rig 12 moving closer to the obstacle or vice versa, or both.

Further, the relative trajectory between the obstacle and the drill rig 12 cannot be determined without knowing which entity is the one that is moving and whether or not the drill rig 12 is rotating. Thus, by analysing data from the scanners 38, possibly with readings from the tilt sensors, and data from the HPGPS 50, it is possible to make a more in-depth analysis of the surroundings of the drill rig 12. In particular, the drill rig operating system 10 is able to determine whether or not an obstacle is moving towards the drill rig 12 or away from it, how fast such an obstacle is moving, a trajectory of the obstacle, or the like.

It is therefore an advantage of the described disclosure that a system and method are provided which are configurable so that rules relating to tramming and other actions of the drill rig 12 can change depending on the type of boundary of the SWA 30 which is encountered by the drill rig 12. An effective, simple and configurable means of enabling detection zones is provided allowing fully autonomous operation of the drill rig 12 on the bench 26 so that the edge holes of the blast hole pattern can be drilled under autonomous operation of the drill rig 12. This has the benefit that operator intervention to drill the edge holes is obviated improving the operating efficiency of the drill rig 12.

Further, by having the scanners 38 mounted on the drill rig 12, an automated system to assist in the prediction of safe tramming distances to specific obstacles is provided. As described above, at present drill rig operators are required to assess the safe area of operation of the drill rig 12 by using on-board video cameras of the drill rig 12. Whilst these cameras provide the operator with some awareness of the surrounding operational zone, they do not provide a full field of view. In addition, these cameras consume significant communications bandwidth and do not easily support automated detection of obstacles.

By integrating data from the scanners 38 into the system 10 that can predict the safe area of operation of the drill rig 12 not only improves the operating efficiency of the drill rig 12 but also improves safety integrity and reduces the workload on the drill rig operators overseeing operation of the drill rig 12.

At present the remotely located drill operator needs to make a judgment call based on feedback observed from the streamed video feed. The system 10 obviates this need and allows for automated pattern drilling with minimal, if any, human intervention. Further, the system 10 effects most computational analysis of the raw data on the drill rig 12 with minimal raw data to allow visualization and key data objects transmitted back to an operations centre where the drill rig operator is located and, in so doing, minimises data communication traffic.

Further, by having the scanners 38 scan in a substantially vertical plane or orientation a vertical cross-section of the topography in the direction of interest (i.e. the direction of tramming) of the drill rig 12 is provided. In addition the scanners 38 are able to identify the geometries of the obstacles to provide to the system 10.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method of operating a vehicle in an area, the method including:
   demarcating a pre-configured safe working area (SWA) within the area, the SWA being implemented as an electronic representation of a boundary of the area;
   generating a zone of interest about the vehicle;
   scanning for obstacles relative to the zone of interest;
   determining if a detected obstacle satisfies both conditions of being within the SWA and being within the zone of interest; and
   taking action regarding further traversal of the area by the vehicle depending on whether or not both preceding conditions are satisfied.

2. The method of claim 1 which includes, if both of the preceding conditions are satisfied and if the obstacle is determined to have at least one characteristic that adversely affects continued traversal of the area by the vehicle, causing the vehicle to cease traversal of the area.

3. The method of claim 1 which includes, if both of the preceding conditions are satisfied but a determination has been made that the determined conditions of the obstacle permit traversal of the area by the vehicle relative to the obstacle, modifying the zone of interest to permit further traversal of the area by the vehicle relative to the obstacle.

4. The method of claim 3 which includes modifying the zone of interest so that the obstacle falls outside or on the boundary of the zone of interest.

5. The method of claim 1 which includes generating a plurality of concentrically arranged zones of interest and taking action depending on in which of the zones of interest the obstacle is detected.

6. The method of claim 5 which includes selecting a number of the concentrically arranged zones of interest and taking action dependent on a number of criteria.

7. The method of claim 6 which includes selecting the number of zones of interest and their shape either from a library of preconfigured zones of interest or dynamically.

8. The method of claim 5 which includes generating a first, inner zone of interest about the vehicle and a second, outer zone of interest about the vehicle and taking action regarding further traversal by the vehicle depending on in which zone of interest the obstacle has been detected.

9. The method of claim 8 which includes generating an alarm condition if the detected obstacle is in the outer zone of interest and disabling further traversal of the area by the vehicle if the obstacle is in the inner zone of interest, in both cases, the obstacle further being within or on a boundary of the SWA.

10. The method of any claim 1 which includes generating a bounding zone of interest to approximate a footprint of at least a predetermined part of the vehicle.

11. The method of claim 10 which includes altering a shape of the bounding zone of interest based on at least one of a characteristic of the obstacle detected and a change in a configuration of the vehicle.

12. The method of claim 10 which includes altering the shape of the bounding zone of interest either from a library of preconfigured zones of interest or dynamically.

13. The method of claim 1 which includes scanning a region about the vehicle to assess characteristics of the obstacle.

14. The method of claim 13 which includes scanning a region about the vehicle in a vertical orientation to generate a vertical cross-sectional representation of the obstacle.

15. The method of claim 14 which includes implementing the scanned obstacle as at least one polygon representing the obstacle and its characteristics.

16. The method of claim 13 which includes assessing the scanned obstacle to determine whether or not the vehicle can safely traverse the obstacle.

17. The method of claim 1 which includes generating a shape of the zone of interest to extend further from the vehicle in directions in which the vehicle traverses the area than in directions transverse to the directions of traversal of the vehicle.

18. The method of claim 1 wherein the SWA is implemented independent of a vehicle location.

19. A vehicle operating system for controlling operation of a vehicle in an area in which a pre-configured safe working area (SWA) is demarcated, the SWA being implemented as an electronic representation of a boundary of the area, the system including a periphery generator module for generating a periphery of a zone of interest about the vehicle and to output zone data;
   a scanning arrangement mountable to the vehicle for scanning a region about the vehicle, including the zone of interest, for obstacles and to output obstacle data; and
   a processing module responsive to the zone data, the obstacle data and SWA data relating to the SWA to determine if a detected obstacle satisfies both conditions of being within the SWA and being within the zone of interest, the processing module causing action to be taken regarding further traversal of the area by the vehicle depending on whether or not both conditions are satisfied.

20. The system of claim 19 in which, if the obstacle is determined to have at least one characteristic that adversely affects continued traversal of the area by the vehicle and both of the preceding conditions are satisfied, the processing module is configured to cause the vehicle to cease traversal of the area.

21. The system of claim 20 in which the processing module is configured to modify the zone of interest to permit continued traversal of the area by the vehicle relative to the obstacle if both of the preceding conditions are satisfied but a determination has been made that the determined conditions of the obstacle permit traversal of the area by the vehicle relative to the obstacle.

22. The system of claim 21 in which the processing module is configured to modify the zone of interest so that the obstacle falls outside or on the boundary of the zone of interest.

23. The system of claim 19 in which the periphery generator module is configured to generate a plurality of concentrically arranged zones of interest and to cause the processing module to take action depending on in which of the zones of interest the obstacle is detected.

24. The system of claim 23 in which the periphery generator module is configured to select a number of the concentrically arranged zones of interest and to cause the processing module to take action dependent on a number of criteria.

25. The system of claim 24 in which the periphery generator module selects the number of zones of interest and their shape either from a library of preconfigured zones of interest or dynamically.

26. The system of claim 19 in which the periphery generator module is configured to generate a first, inner zone of interest about the vehicle and a second, outer zone of interest about the vehicle, the processing module being configured to take action regarding further passage of the vehicle depending on in which zone of interest the obstacle has been detected.

27. The system of claim 26 in which the processing module is configured to generate an alarm condition if the detected obstacle is in the outer zone of interest and to cause the vehicle to cease further traversal of the area if the detected obstacle is within the inner zone of interest, in both cases, the obstacle further being within or on a boundary of the SWA.

28. The system of claim 27 in which the processing module is configured to control a vehicle controller of the vehicle to control traversal of the area by the vehicle.

29. The system of claim 19 in which the periphery generator module is configured to generate a bounding zone of interest to approximate a footprint of at least a predetermined part of the vehicle.

30. The system of claim 29 in which the periphery generator module alters a shape of the bounding zone of interest based on at least one of a characteristic of the obstacle detected and a change in a configuration of the vehicle.

31. The system of claim 29 in which the periphery generator module is configured to alter the shape of the bounding zone of interest either from a library of preconfigured zones of interest or dynamically.

32. The system of claim 19 in which the scanning arrangement includes at least one scanner mountable to the vehicle, the at least one scanner being operable to scan a region about the vehicle to assess characteristics of the obstacle.

33. The system of claim 32 in which the at least one scanner is mountable to the vehicle to scan a region about the vehicle in a vertical orientation to generate a vertical cross-sectional representation of the obstacle.

34. The system of claim 33 in which the processing module is configured to process the obstacle data output by the at least one scanner to generate at least one polygon representing the obstacle and its characteristics.

35. The system of claim 34 in which the processing module is configured to display the at least one polygon on a display associated with the vehicle and to display points of inflection relative to the at least one polygon.

36. The system of claim 32 in which the processing module is configured to use the obstacle data to determine whether or not the vehicle can safely traverse the obstacle.

37. The system of claim 19 in which the SWA is implemented as an electronic representation of a boundary of the area, and in which the processing module includes a data store in which the SWA is stored.

38. The system of claim 37 in which the electronic representation of the boundary differentiates as to a type of obstacle defining the boundary.

39. The system of claim 19 in which the periphery generator module is configured to generate the zone of interest depending on a direction of traversal of the vehicle with the zone of interest extending further from the vehicle in directions of traversal of the vehicle than in directions transverse to directions of traversal of the vehicle.

40. The system of claim 19 wherein the SWA is implemented independent of a vehicle location.

41. A method of operating a vehicle in an area in which obstacles are present, the method including scanning a region about the vehicle to detect whether or not an obstacle is present, the scanning occurring in a vertical orientation to generate a vertical cross-sectional representation of the obstacle; and if an obstacle is detected, scanning the obstacle to assess characteristics of the obstacle, displaying the scanned obstacle as at least one polygon representing the obstacle and its characteristics, wherein displaying scanned obstacle includes displaying points of inflection relative to the at least one polygon.

42. The method of claim 41 which includes displaying the scanned obstacle as a plurality of two-dimensional polygons.

43. The method of claim 41 which includes assessing the scanned obstacle to determine whether or not the vehicle can safely traverse the obstacle.

44. The method of claim 43 which includes assessing the scanned obstacle to determine at least one of a height and a slope of the obstacle.

45. A vehicle operating system for operating a vehicle in an area in which obstacles are present, the system including a scanning arrangement mountable to the vehicle, the scanning arrangement being operable to scan a region about the vehicle to detect whether or not an obstacle is present and to output obstacle data, the scanning occurring in a vertical orientation to generate a vertical cross-sectional representation of the obstacle; and a processing module which is responsive to the obstacle data output by the scanning arrangement to assess characteristics of an obstacle detected by the scanning arrangement.

46. The system of claim 45 in which the processing module is configured to implement the scanned obstacle as at least one polygon representing the obstacle and its characteristics and in which the system includes a display on which the at least one polygon is displayed.

47. The system of claim 46 in which the processing module is configured to display, on the display, points of inflection relative to the at least one polygon.

48. The system of claim 46 in which the processing module is configured to implement the scanned obstacle as a plurality two dimensional polygons.

49. The system of claim 45 in which the processing module is configured to determine whether or not the vehicle can safely traverse the obstacle.

50. The system of claim 49 in which the processing module is configured to determine at least one of a height and a slope of the obstacle.

* * * * *